United States Patent [19]

Bloodworth

[11] 4,271,351

[45] Jun. 2, 1981

[54] CASH REPLACEMENT SYSTEM AND COMPONENTS

[76] Inventor: William T. Bloodworth, 24W631 Hobson Rd., Oak Brook, Ill. 60540

[21] Appl. No.: 67,569

[22] Filed: Aug. 17, 1979

[51] Int. Cl.³ .................. G06K 7/08; G06K 19/06
[52] U.S. Cl. ........................... 235/375; 235/449; 235/488; 235/493; 360/2
[58] Field of Search ............ 235/449, 487, 488, 493, 235/383, 384, 454, 462, 463, 375; 360/2

[56] References Cited

U.S. PATENT DOCUMENTS

| | | | |
|---|---|---|---|
| 3,531,627 | 9/1970 | Ham | 235/488 |
| 3,754,119 | 8/1973 | Scott et al. | 235/383 |
| 3,895,220 | 7/1975 | Nelson et al. | 235/387 |
| 3,935,933 | 2/1976 | Tanaka et al. | 235/493 |
| 4,020,325 | 4/1977 | Pfost et al. | 235/449 |

*Primary Examiner*—Daryl W. Cook
*Attorney, Agent, or Firm*—Thomas E. Dorn

[57] ABSTRACT

A cash replacement system using consumable transaction cards, each card comprising a body portion bearing multi-digit magnetically recorded validation and identification codes and a transaction portion divided into a plurality of transaction segments bearing the identification code and a denomination code, both magnetically recorded. A card reader senses the validation code and severs one transaction segment from the card for each transaction after checking the denomination and assuring presence of the required segment. Printed indicia on each card enable the user to determine the number and denomination of possible remaining transactions.

13 Claims, 9 Drawing Figures

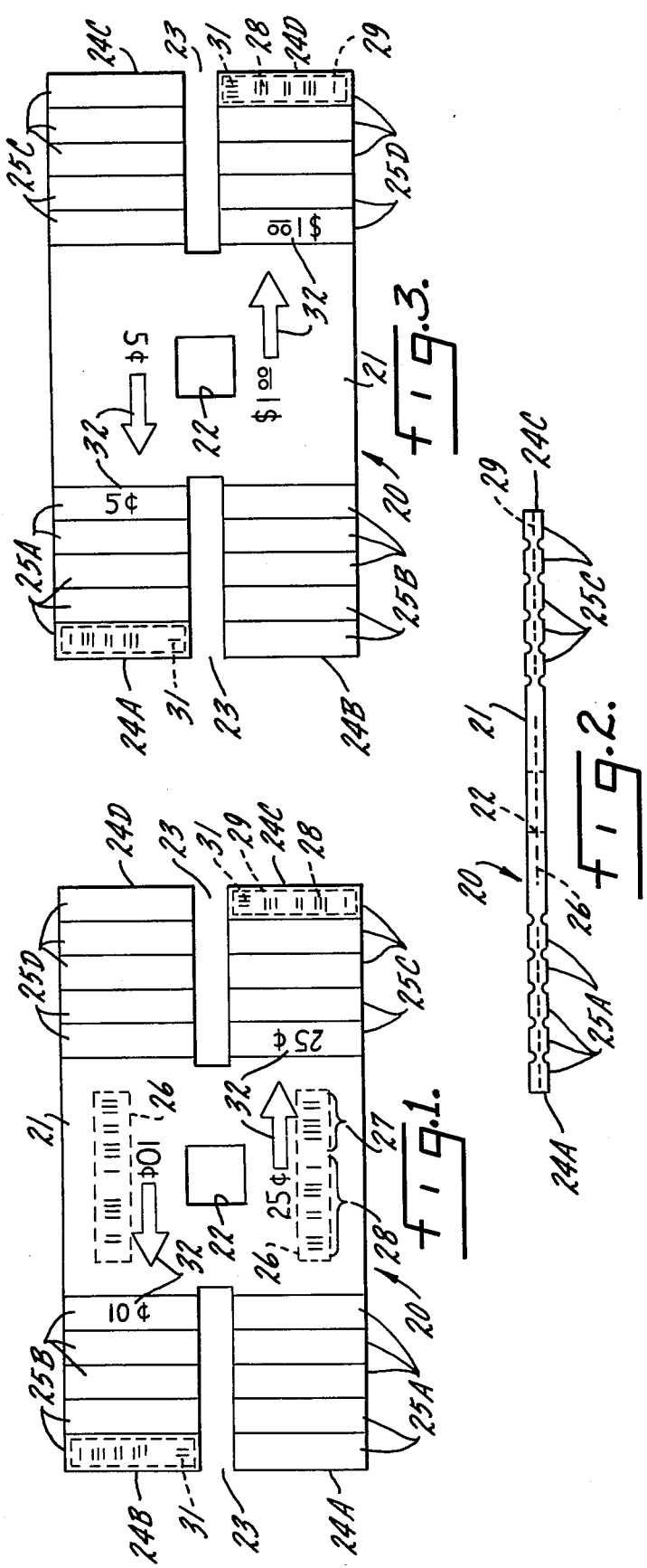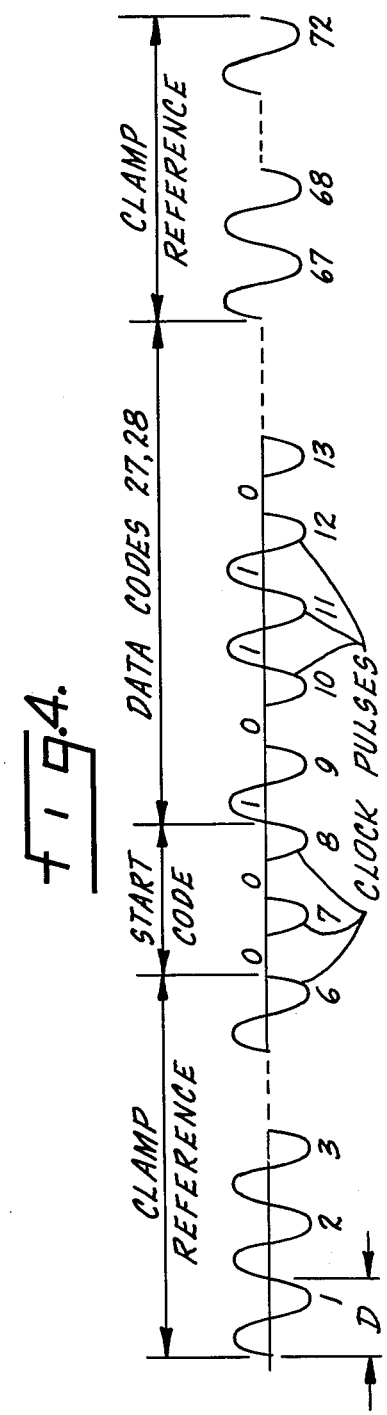

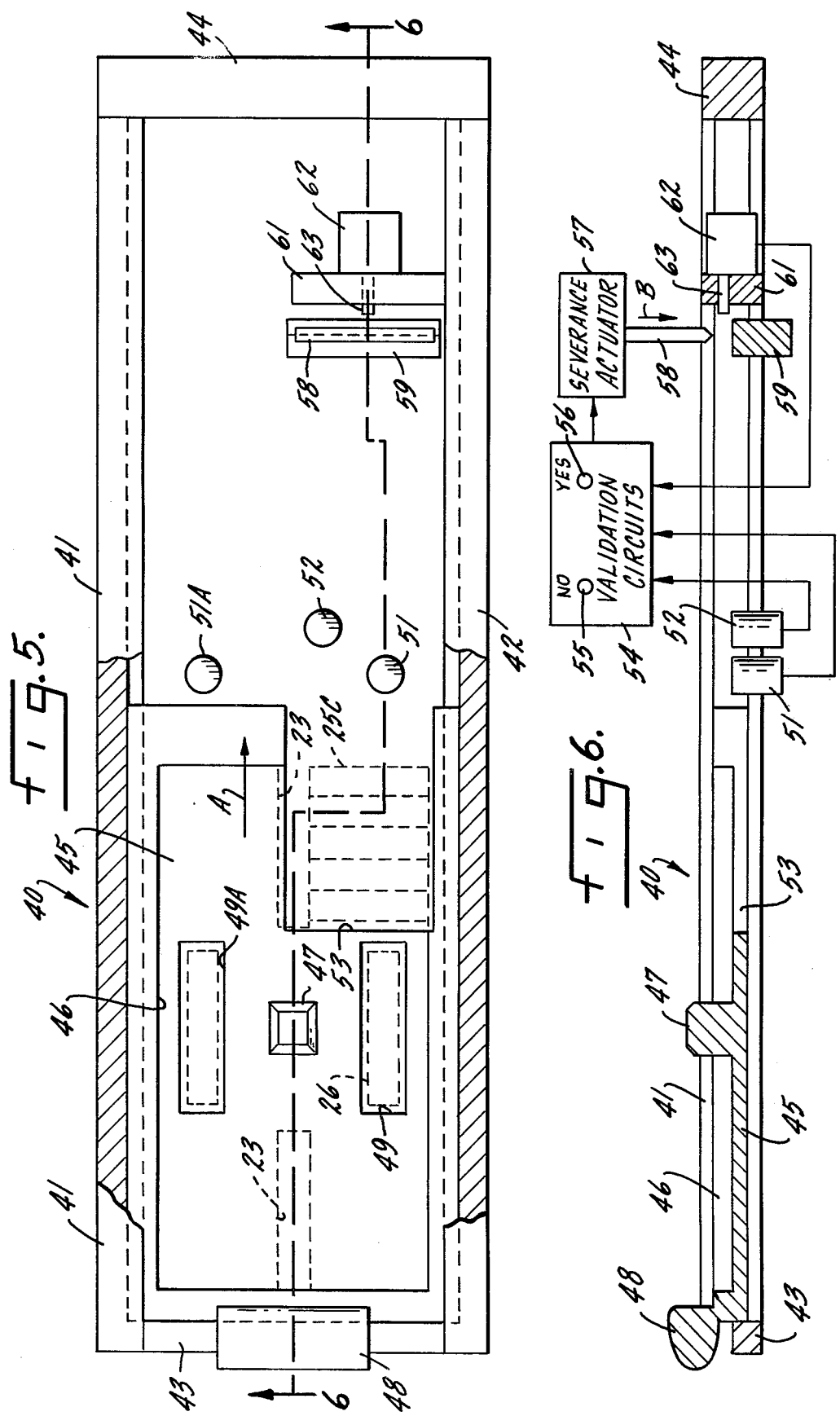

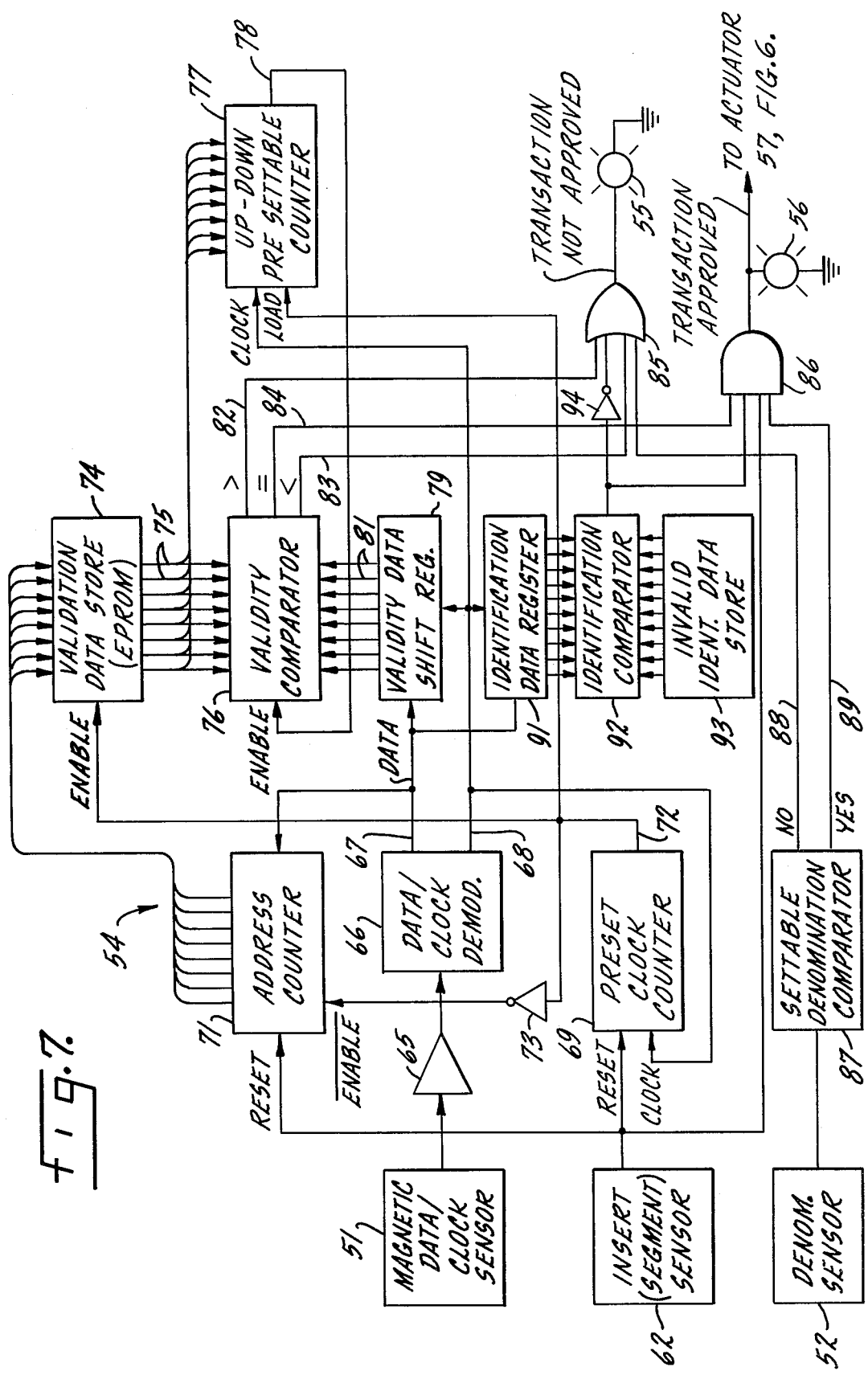

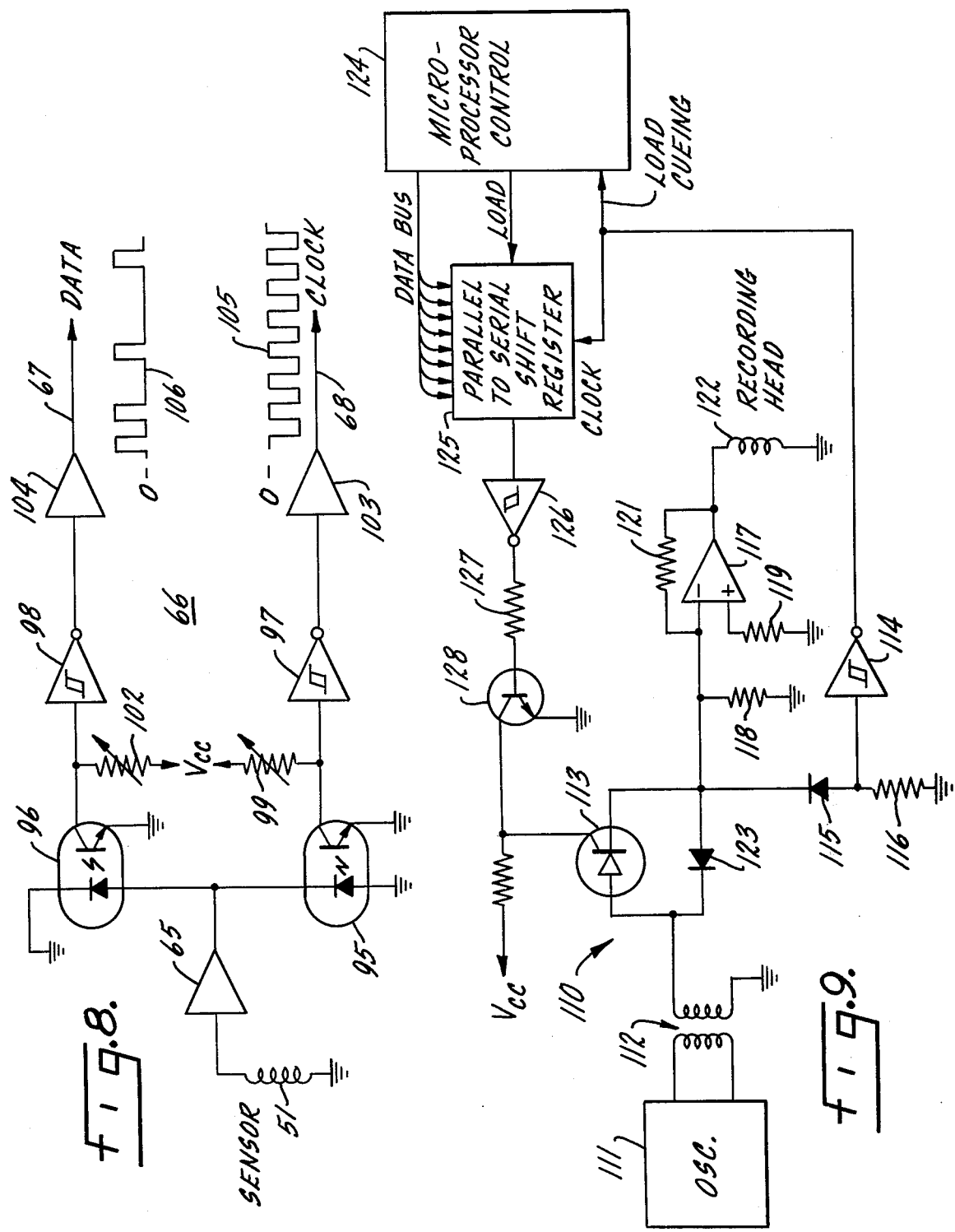

CASH REPLACEMENT SYSTEM AND COMPONENTS

There are numerous applications in which elimination of individual cash transactions can be of substantial benefit. A prime example is in the operation of vending machines for candy, cigarettes, gum, sandwiches and other food items, newspapers or other articles. Public transportation provides another area in which the elimination of cash transactions may be highly desirable, encompassing bus systems, subway systems, commuter trains and even taxi cabs. Movie theaters, gasoline service stations, and convenience grocery stores afford other situations in which it may be desirable to replace cash transactions with other accounting and payment procedures. Indeed, the same may be said of health and medical services, telephones, hotels and motels. and many other businesses in which large numbers of transactions occur. In any of these applications, an effective cash replacement system should afford improved security, reduce the possibility of theft, and eliminate the requirement for purchasers to carry substantial quantities of coins and paper money.

Most cash replacement systems are credit systems, exemplified by the ubiquitous credit cards issued by financial institutions, oil companies, car rental companies, and department stores and other retail establishments. Credit systems, though highly useful for relatively large transactions, are often uneconomical as applied to a multitude of small transactions, due to the costs of subsequent collection.

Cash replacement systems that provide for advance payment have been previously proposed, most frequently in the transportation field. Thus, commuter railroads have employed presold tickets of various kinds, some are "flash" cards good for a predetermined period of time with no limitation on the number of rides involved, whereas others incorporate detachable stubs or punch locations so that each card covers a given number of rides. A relatively complex version of a cash replacement system used for transportation purposes is presented in Ham U.S. Pat. No. 3,531,627, issued Sept. 29, 1970, utilizing a card having a multiplicity of magnetic punch locations. The coding of the car may identify such factors as the station at which the card user enters the system, fare increments (punched out at the exit station), and even the time of entry into the system.

Another cash replacement system using a transaction card that may be depleted or consumed in the course of individual transactions is described in Pferd U.S. Pat. No. 3,087,018, issued Apr. 23, 1963. That card is employed for telephone transactions and provides two denominations of cuttable consumption elements; one covering an initial charge for placing a call and the other for overtime.

Still another form of consumable transaction card, expressly designed for use in a governmental lunch subsidy program, is disclosed in Scott et al. U.S. Pat. No. 3,754,119, issued Aug. 21, 1973. In that arrangement, a simple bar-code, using several bars extending across the card, is used to identify a subsidy level for the card bearer. Individual segments of the card are severed for each lunch dispensed; these segments may carry a student identification number or the like to identify the user. The segments also bear the same subsidy level code as the main body of the card.

In most known cash replacement systems, the level of security is inadequate because the coding of the cards is readily obvious to the user. Futhermore, to be truly effective a cash replacement system should afford an accurate and complete audit trail back to the original card purchaser, but this is not possible with customary arrangements. For those applications directed to small denomination transactions, one of the most attractive areas for a cash replacement system, on the other hand, any card or like system element must be relatively inexpensive so that system costs can be kept to a level with the size of the transactions involved. Moreover, an effective cash replacement system should be readily adaptable to a wide variety of different uses and applications without substantial modification of the system itself in order to be truly cost effective.

SUMMARY OF THE INVENTION

It is an object of the present invention, therefore, to provide a new and improved cash replacement system that affords a high level of security, establishes a complete audit trail for all transactions, can be implemented at reasonable cost, and is readily adaptable to a variety of different kinds and types of transactions.

A specific object of the invention is to provide a new and improved cash replacement system using a consumable transaction card from which individual transaction segments are severed in the course of each transaction, with the transaction segments each bearing a machine readable code that identifies the card and hence provides a complete audit trail; the body of each card is also encoded in a manner that permits effective prevention of card use following theft or loss of the card.

Another object of the invention is to provide a new and improved consumable cash replacement transaction card in which coding of both the body of the card and the consumable portions of the card is effected as a single track magnetic record that provides both code data and clock data on the same track.

A further object of the invention is to provide a new and improved cash replacement system, using a consumable transaction card, in which the cards, the card readers, and other system components are relatively simple and inexpensive, yet afford a high level of security and provide a complete audit trail for each transaction.

Accordingly, the invention relates to a cash replacement system comprising a multiplicity of consumable transaction cards, each card including a body portion bearing a plural-bit machine readable identification code distinguishing that card from all other cards in the system and a multi-bit machine readable validation code common to all of the cards, and a transaction portion sub-divided into a plurality of individual transaction seqments sequentially severable from the card, each transaction segment bearing the plural-bit machine readable identification code, each card further bearing human readable indicia enabling the user to determine, at any given time, the number and denominations of transactions that may yet be completed by use of the card. The system further comprises at least one card reader, including a first sensor for sensing the codes on the body portion of one of the cards, a validation data store having the validation code recorded therein, validity comparison means for comparing the validation code from the validation data store with a validation code output from the first sensor to determine the presence of a validity match, a second sensor for sensing the presence of a transaction segment on the card, and transaction approval means, connected to the comparison means and the second sensor, responsive to the combination of a validity match and presence of a transaction segment, for approving a transaction; completion of each transaction including severance of the transaction segment from the card. Preferably, plural-bit magnetic coding is used for all card codes; in the preferred construction, each card reader includes means, actuated by the transaction approval means, for severing a segment from the card on completion of each transaction.

BRIEF DESCRIPTION OF THE DRAWINGS

FIG. 1 is a plan view of a consumable cash replacement transaction card constructed in accordance with one embodiment of the present invention;

FIG. 2 is a side elevation view of the card of FIG. 1;

FIG. 3 is a bottom view of the card of FIG. 1;

FIG. 4 is a waveform diagram used to explain the preferred technique for recording code data on the transaction card;

FIG. 5 is a partly schematic plan view of a card reader for a cash replacement transaction system that utilizes the card of FIGS. 1–3;

FIG. 6 is partly schematic section view taken approximately as indicated by lines 6—6 in FIG. 5;

FIG. 7 is a block diagram of an electronic control for the card reader of FIGS. 5 and 6;

FIG. 8 is a schematic diagram of one circuit for the control of FIG. 7; and

FIG. 9 is a schematic diagram of a modulator employed to provide magnetic recording in the form shown in FIG. 4.

DESCRIPTION OF THE PREFERRED EMBODIMENTS

FIGS. 1–3 illustrate a consumable cash replacement transaction card 20 constructed in accordance with one embodiment of the present invention. Card 20 may be formed of card stock or other relatively stiff paper, or may be of plastic construction. In either event, the card is preferably of laminated construction as described hereinafter. Card 20 includes a body portion 21 having a central alignment aperture 22. Two slots 23 extend inwardly from the opposite ends of the card, dividing the ends of the card into four transaction portions 24A, 24B, 24C and 24D. Each transaction portion is subdivided into a plurality of inidvidual transaction segments that are sequentially detachable from the card. As shown, transaction portion 24A includes five segments 25A, portion 24B has five segments 25B, portion 24C includes five transaction segments 25C, and there are five transaction segments 25D in portion 24D. The individual transaction segments should be readily indentifiable to the user on visual inspection of the card so that it will be possible for the user to determine, at any given time, the number of denominations of transactions that may yet be completed by use of the card. Delineation of the segments may be accomplished simply by printing of separation lines on the card, or by weakened score lines between the segments as indicated in FIG. 2.

At least one thin film 26 of magnetic material is laminated into the body portion 21 of card 20; as indicated in FIG. 1, there are preferably two such films 26. A multibit machine readable validation code 27 common to all of the cards in a series is magnetically recorded on each of the films 26. In addition, the magnetic films 26 in the body portion 21 of card 20 bear a plural-bit machine readable identification code 28 that characterizes the specific transaction card 20 and distinguishes that card from all other cards in the series. The same identification code 28 is magnetically recorded on a thin film 29 laminated into each of the individual transaction segments 25A–25D of card 20. A transaction denomination code 31 is also magnetically recorded on the film 29 in each of the transaction segments. Card 20 included transaction segments of four different denominations, ranging from one dollar for each of the transaction segments 25D down to five cents for each of the transaction segments 25A. Human readable indicia 32 specify the denominations for each set of transaction segments. Of course, if all of the segments have the same denomination, indicia 32 may be eliminated and the user can identify the number of remaining transactions simply by counting the remaining transaction segments.

The preferred technique for recording the validation codes 27 and identification codes 28 is generally illustrated in FIG. 4. The code recording starts with a cyclic pulse signal of constant displacement D recorded by means of a constant frequency audio tone signal of generally sinusoidal wave form. At the beginning of a code strip, such as code strip 26 (FIG. 1) several unmodulated cycles of the tone signal are recorded as a clamping reference. Encoding is accomplished by selective inhibition (elimination) of one polarity (positive pulses in FIG. 4) of the audio sine wave. The opposite polarity is recorded continuously to afford a clock signal. An appropriate start signal initiates the code, followed by the requisite data constituting the validation and identification codes 27 and 28. For the given example, it will be seen that the start code is 00 and that the beginning of the data codes is 10110. At the end of the data codes, a stop code different from the start code is recorded, preferably followed by another sequence of clamp reference cycles. This arrangement permits reading of the code from either direction.

The particular recording technique shown in FIG. 4 provides high noise immunity and affords a code recording that is essentially unaffected by variation in the speed of scanning, since there is a continuous clock signal for timing the code reading operation. A simple and inexpensive encoding apparatus is described hereinafter in connection with FIG. 9.

FIGS. 5 and 6 show a mechanical arrangement for a card reader 40 for a cash replacement system using cards 20. Card reader 40 comprises two elongated side rails 41 and 42 of C-shaped cross-sectional configuration joined together at opposite ends by stop members 43 and 44 to complete a card reader frame. A slide 45 is mounted in the frame and is longitudinally movable therein as indicated by arrow A. Slide 45 has a central recess 46 in which one of the cards 20 may be mounted, with a central post 47 extending upwardly through the central aperture 22 of the card (see FIG. 1). The position of the card is generally indicated by the dash outlines 23, 25C and 26 in FIG. 5. Slide 45 may be equipped with a suitable handle 48.

Card reader 40 further comprises a first sensor 51 for sensing the validation and identification codes on the body portions of the cards used in the system. As shown in FIG. 5, sensor 51 is aligned with the code data strip 26 in one of the transaction cards when the card is mounted in slide 45. Slide 45 has a cutout portion 49 in the area immediately below strip 26, so that the slide will not interfere with effective sensing of the code data magnetically recorded on strip 26. As shown in FIG. 6, sensor 51 is located immediately below the bottom surface of slide 45 so that the air gap for a magnetic sensing operation is minimized.

Card reader 40 further includes a denomination sensor 52 that is aligned with the denomination codes on the transaction segments 25C of the card that are exposed through another aperture 53 in slide 45. The two sensors 51 and 52 are electrically connected to a validation circuit unit 54 which may incorporate the construction described below in connection with FIG. 7. The validation circuit unit 54 may include two indicator lamps 55 and 56 to identify invalid and valid transactions, respectively. The validation circuit unit 54 is connected to a severance actuator 57, typically a solenoid operated plunger, that actuates a knife or guillotine element 58. Knife 58 is aligned with an anvil 59.

A segment stop member 61 is positioned closely adjacent to knife 58 and anvil 59. A segment sensor 62, for sensing the presence of a transaction segment on a card, is positioned immediately adjacent stop member 61. Sensor 62 may comprise a small sensing switch having an actuating plunger 63 extending through stop member 61 in position to engage the leading edge of the transaction portion on one of the cards.

An electronic control circuit for validation unit 54 is illustrated in FIG. 7. As shown therein, the magnetic reading head comprising sensor 51 is connected through a preamplifier and filter circuit 65 to a data and clock demodulator 66 having a data output 67 and a clock output 68. Sensor 62, on the other hand, is connected to a preset clock counter 69 and to an address counter 71. Clock counter 69 has an input connection from the clock output 68 of demodulator 66. The output 72 of clock counter 69 is connected through an inverter 73 to address counter 71. A data input for address counter 71 is derived from the data output 67 of demodulator 66.

The validation circuit unit 54 for the card reader, FIG. 7, includes a validation data store 74 in which a predetermined validation code is recorded. The validation code may be changed weekly, monthly, or on some other schedule, depending on the application. In the preferred construction, store 74 is an erasable programmable read-only-memory unit (EPROM) of conventional construction having eight input circuits derived from eight outputs of address counter 71. An enabling input to store 74 is derived from the output 72 of clock counter 69. Store 74 has eight outputs 75 that are connected to a comparator 76 and to an up-down presettable counter 77. Counter 77 has a clock input derived from the clock output 68 of demodulator 66 and a load input taken from the output 72 of clock counter 69. The output 78 of counter 77 affords an enable input to comparator 76.

A series-to-parallel shift register 79 is incorporated in the validation control circuit 54 (FIG. 7). Shift register 79 has an input connection from the data output 67 of demodulator 66. A clock input to shift register 79 is taken from the clock output 68 of the demodulator. Shift register 79, in the illustrated configuration, has a capacity of eight bits, with eight output circuits 81 connected to comparator 76.

Comparator 76 has an excess count output 82, a deficiency count output 83, and an equality or match output 84. The comparator outputs 82 and 83 are connected to respective inputs of an OR gate 85 that affords an energizing circuit for the indicator lamp 55 that indicates a particular transaction is not approved. The equality of match output 84 of comparator 76 is connected to one input of an AND gate 86 incorporated in an energizing circuit for the transaction approved indicator lamp 56; the output from gate 86 also affords the actuating signal for severance actuator 57. Gate 86 has an additional input from sensor 62.

For those systems in which the transaction card carries segments of difference denominations, like card 20 (FIGS. 1–3), circuit 54 (FIG. 7) also includes a settable denomination comparator 87 that can be set to identify any of the denomination codes that may appear on the card. Comparator 87 has an input derived from sensor 52 and has two outputs; one output 88 indicates a failure to identify a denomination match and is connected as an additional input to OR gate 85. The other output 89 from comparator 87 is connected as an additional input to AND gate, 86, output 89 affording a signal indicative of a denomination equality determination.

It is now possible to consider operation of the cash replacement system, based on the card and reader components described above. In any such system there will be a multiplicity of cash replacement cards like card 20, each bearing an individual distinguishing identification code and all bearing the same validity code. The system could be based on only one card reader 40; more frequently, there will be several card readers at different vending machines or other transaction locations. For the following description, it is assumed that card 20 is to be used in the card reader 40 to effect a single transaction having a value of twenty five cents.

To go forward with this transcation, in the system as specified, card 20 is positioned in recess 46 of slide 45 in card reader 40 in the orientation shown in FIGS. 1 and 5. The card is accurately located in the slide by engagement of center post 47 in aperture 22 of the card. The party conducting the transaction then uses handle 48 to drive slide 45 in the direction of arrow A (FIG. 5) so that the magnetic recorded strip 26 on the card traverses the magnetic reading head comprising sensor 51 and the denomination code on each segment 25C of the card passes over sensor 52, it being assumed that the card has at least one segment 25C remaining. As strip 26 passes over sensor 51, the composite data and clock encoding is sensed, producing a series of pulse signals of the form illustrated in FIG. 4; these signals are amplified to a usable level in amplifier 65 (FIG. 7). In circuit 66, the signals are decoded and separated, producing a clock output on line 68 and a data output on line 67.

The train of data pulses from output 67 of demodulator 66 is supplied to shift register 79, which transfers data internally on each positive-going clock transition. The data pulse signal is also supplied to counter 71, an eight bit binary counter clocking on the positive transition of all data "ones." The clock signal from output 68 of circuit 66 is employed to advance data in the shift register 79 and is also applied to counter 69, a programmable eight bit counter that can be preset to any number between zero and 255.

When counter 69 has advanced to its preset number, it develops an enabling signal at its output 72 and this enabling signal is applied to the validation data store 74. The same signal from counter 69 is also applied to counter 71 to disable that counter, freezing its output. The output signal from counter 69 also causes the data stored at the existing address, the output from store 74, to be loaded into the up-down presettable counter 77, which counts down in response to clock pulses supplied thereto from demodulator 66.

When the count in counter 77 reaches zero an output signal from the counter (on line 78) is applied as an enabling signal to comparator 76. Comparator 76 compares the previously selected output from store 76 with the existing data present and latched in shift register 79. If the code data stored in shift register 79 matches with the input to the comparator from store 74, the equal or identity output 84 of comparator 76 goes high.

If the denomination code sensed by magnetic sensor 52 (FIGS. 5-7) matches the denomination preset in comparator 87 (FIG. 7) the input 89 to AND gate 86 is also high. Consequently, when the movement of the card into the card reader is completed and the segment sensor 62 is actuated, AND gate 86 supplies an output signal to actuator 67 (FIG. 5), which drives the guillotine 58 downwardly in the direction of arrow B to cut off one transaction segment 25C from the card. At the same time, the indicator lamp 56 is energized to indicate that the transaction is completed.

The insertion sensor 62 also applies a reset signal to counters 69 and 71, restoring the two counters to condition for the next operation.

If comparator 76 does not identify a validity code match, a high output will appear on either the excess count output 82 or the deficiency count output 83. In either case, gate 85 operates to energize lamp 55 to indicate that the transaction is not approved. The same operation occurs of comparator 87 fails to identify a match between the denomination code on the card segment and the preset code of the comparator.

In some applications, where selling presonnel are in attendance at the point of transaction, the actuation of the transaction approved lamp 56 constitutes an adequate transactional output from card reader 40. In other instances, however, the output signal from AND gate 86 may be utilized to cause other equipment to complete the desired transaction. Thus, a transaction approved output from gate 86 may be employed to actuate a turnstile release in a transportation system, to actuate a vending machine to release a desired product, or for other like purposes. In those instances in which there is no transaction segment remaining on the card, the insertion sensor 62 is not actuated because the slide 45 completes its movement in the direction of arrow A, coming to a half against stop member 44 with no transaction segment engaging the insertion sensor.

By collecting the transaction segments from card reader 40 and the other card readers in the given system, a complete audit trail can be provided for each and every transaction. Thus, each transaction segment identifies both the denomination of the transaction and the transaction card involed. The machine readable information on the transaction segments thus makes it possible to account for all transactions in complete detail.

In the foregoing description of the operation of reader 40 and the associated validation circuits 54 (FIGS. 5-7), no direct use is made of the identification number 28 recorded on the magnetic strip 26 in the body of each card. In those systems in which card theft or loss may be a distinct economic problem, however, this identification code may also be utilized in a security check. Thus, as shown in FIG. 7, the validation circuits 54 may include an additional register 91 for recording identification code data 28 from strip 26. Register 91 is connected to an identification comparator 92 that is also connected to a store 93 in which the identification codes for invalid cards are recorded. Invalid cards, in this instance, comprise cards that have been stolen or lost. The output from comparator 92 is normally high, enabling the transaction approved AND gate 86 for a routine transaction. However, if a comparison match is found between the identification number on a card and one of the invalid identification codes in store 93, the output from comparator 92 goes low so that there can be no transaction approval. An inverter 94 connecting the output of the comparator 92 to gate 85 can be employed to signal that the transaction is not approved by energizing lamp 55.

For purposes of economy, card 20 may be fabricated with only one body code strip 26 instead of two as shown in FIGS. 1 and 3. In this modification of the system, slide 45 requires another exposure slot 49A and a second data/clock sensor 51A, sensor 51A being connected in parallel with sensor 51.

A specific circuit for the data/clock demodulator 66 is shown in FIG. 8. As illustrated therein, the output from amplifier 65 is connected to two oppositely-polarized optoisolators 95 and 96 connected to the inputs of two Schmitt triggers 97 and 98 respectively, utilizing resistors 99 and 102 in the input circuits for the triggers. Resistors 99 and 102 are each adjustable over a range of about 25 to 100 kilohms for noise and sensitivity adjustment. The outputs 67 and 68 are derived through two output amplifiers 104 and 103 respectively, the output waveforms being generally indicated at 105 and 106. The buffer amplifiers 103 and 104 may be type 4050; if inversion is required, type 4049 may be employed.

FIG. 9 provides a circuit diagram for an encoding modulator that may be utilized in recording the machine readable data on the magnetic strips 26 and 28 in the transaction cards, affording the desired form of recorded data illustrated in FIG. 4. The modulator 110 shown in FIG. 9 is driven from an audio frequency oscillator 111 through a transformer 112, the secondary of transformer 112 being connected to the anode of a signal-controlled rectifier 113. The cathode of SCR 113 is connected to a Schmitt trigger 114 by means of an input circuit comprising a diode 115 and a resistor 116. The cathode of SCR 113 is also connected to the negative input of an operational amplifier 117 by means of an input circuit comprising a resistor 118. A diode 123 affords a direct connection from the secondary of transformer 112 to the negative input of amplifier 117. The positive input of amplifier 117 is returned to ground through a resistor 119 and the output of the amplifier is connected back to the negative input by a feedback resistor 121. The output of amplifier 117 is also connected to a magnetic recording head shown as a coil 122.

The encoding modulator 110 of FIG. 9 further comprising a microprocessor control 124 having a data bus connected to a parallel-to-serial shift register 125. A load input to shift register 125 is derived from the outut of trigger 114 which is also connected to control 124 as a load signal output from microprocessor control 124 to shift register 125. The output of shift register 125 is connected through a Schmitt trigger 126 and a resistor 127 to the base of a transistor 128 that is connected to the gate electrode of SCR 113.

In operation, the negative-going portion of each cycle of the audio signal from oscillator 111 is supplied to operational amplifier 117 through diode 123 and hence is applied to recording head 122. Thus, the negative portion of each input signal cycle is used as a recording signal to record the clock pulses of the code data (FIG. 4). The positive-going portions of the audio signal cycles, on the other hand, are supplied to the input of amplifier 117 only in those instances in which SCR 113 is gated on by a signal from microprocessor control 124, supplied through circuit elements 125–128. It will be recognized that a relatively simple program for microprocessor control 124 can be readily developed to effect the necessary control of the recording of positive half cycles to obtain a code of the form illustated in FIG. 4.

From the foregoing description, it can be seen that the transaction card and system of the present invention permit use of the card for virtually any kind of transaction. The material used in fabrication of the card must allow the card to be depleted or consumed with each transaction; thus, a frangible or readily cuttable construction must be employed.

The individual transaction segments of the cards 20, which are removed in reader 40, afford a complete proof of the transaction, including the amount and identification of the card used in the transaction. The identification and validity codes on the card permit a thorough and complete validity check before any transaction is effected. Each transaction card represents a specific total worth and this worth is physically depleted as the card is used. The remaining value of the card is always directly readable by its user with no need for specialized equipment, based on the printed indicia on the card. The card may be used either as a replacement for cash or as a direct exchange medium. Of course, in some applications there will be no necessity for varying denominations (i.e. a public transportation system with a fixed fare) in which case the denomination code on the individual transaction segments can be eliminated with a corresponding simplification of the reader control circuit 54 (FIG. 7) by elimination of sensor 52 and comparator 87.

I claim:

1. A consumable cash replacement transaction card comprising:
    a body portion bearing a plural-bit machine readable indentification code characterizing the specific transaction card and distinguishing that card from all other cards in a multi-card series, and further bearing a multi-bit machine readable validation code common to all cards in the series; and
    a transaction portion sub-divided into a plurality of individual transaction segments sequentially detachable from the card, each transaction segment bearing the plural-bit machine readable indentification code characteristic of the transaction card;
    the card further bearing human readable indicia enabling the user to determine, at any given time, the number and denominations of transactions that may yet be completed by use of the card.

2. A consumable cash replacement transaction card according to claim 1 in which the machine readable codes are magnetically recorded in binary form.

3. A consumable cash replacement transaction card according to claim 2 in which each machine readable code is recorded as a cyclic pulse signal of constant cyclic displacement along a given track, with all excursions of one polarity present to provide a continuous clock output and with selected excursions of the opposite polarity omitted to provide a data output upon scanning of the track.

4. A consumable cash replacement transaction card according to claim 3 in which the waveform of the pulse signal is substantially sinusoidal.

5. A consumable cash replacement transaction card according to claim 1, claim 3, or claim 4 in which each transaction segment also bears a machine readable transaction denomination code.

6. A consumable cash replacement transaction card according to claim 5 in which the card comprises at least two transaction portions, the segments of the two transaction portions having different denominations.

7. A consumable cash replacement transaction card according to claim 2, claim 3 or claim 4 in which the transaction card is of laminar construction, comprising at least one strip of magnetic film laminated between layers of magnetically inert material.

8. A consumable cash replacement transaction card according to claim 5 in which the card comprises at least two transaction portions, the segments of the two transaction portions having different denominations.

9. A cash replacement system comprising:
    a multiplicity of consumable transaction cards, each card comprising a body portion bearing a plural-bit machine readable identification code distinguishing that card from all other cards in the system and a multi-bit machine readable validation code common to all of the cards, and a transaction portion sub-divided into a plurality of individual transaction segments sequentially severable from the card, each transaction segment bearing the plural-bit machine readable identification code, each card further bearing human readable indicia enabling the user to determing, at any given time, the number and denominations of transactions that may yet be completed by use of the card;
    and a plurality of card readers, each including a first sensor for sensing the codes on the body portion of one of the cards, a validation data store having the validation code recorded therein, validity comparison means for comparing the validation code from the validation data store with a validation code output from the first sensor to determine the presence of a validity match, a second sensor for sending the presence of a transaction segment on the card, and transaction approval means, connected to the comparison means and the second sensor, responsive to the combination of a validity match and presence of a transaction segment, for approving a transaction;
    completion of the transaction including severance of the transaction segment from the card.

10. A cash replacement system according to claim 9 in which each card further comprises segment severing means, actuated by the transaction approval means, for severing a transaction segment from the card.

11. A cash replacement system according to claim 9 or claim 10 in which each reader further includes an identification store having code data identifying invalid card identification codes recorded therein, and in which the validity comparison means also compares the recorded identification code data with an identification code output from the first sensor in determining the presence of a validity match.

12. A cash replacement system according to claim 9, claim 10, or claim 11 in which each transaction segment on each card also bears a machine readable denomination code, and in which each card reader includes denomination sensing means for sensing the denomination codes on the cards and settable denomination comparator means for comparing a denomination code from the denomination sensing means with a pre-set denomination code, and in which the transaction approval means approves a transaction only when a denomination code match is identified by the denomination comparator means.

13. A card reader for a cash replacement system utilizing consumable transaction cards, each card including a body portion bearing machine readable identification and validity codes and a pluraity o sequentially severable transaction segments each bearing the identification code, the card reader comprising:

a first sensor for sensing the codes on the body portion of one of the cards;

a validation data store having a validation code recorded therein;

validity comparison means for comparing the validation code from the validation data store with a validation code output from the first sensor to determine the presence of a validity match;

a second sensor for sensing the presence of a transaction segment on the card;

transaction approval means, connected to the validity comparison means and the second sensor, responsive to the combination of a validity match and the presence of a transaction segment, for approving a transaction;

and segment severing means, actuated by the transaction approval means, for severing a transaction segment from the card.

* * * * *